(12) United States Patent
Wu

(10) Patent No.: US 11,147,114 B2
(45) Date of Patent: *Oct. 12, 2021

(54) METHOD OF HANDLING DUAL CONNECTIVITY AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 134 days.

This patent is subject to a terminal disclaimer.

(21) Appl. No.: 16/048,325

(22) Filed: Jul. 29, 2018

(65) Prior Publication Data

US 2019/0045565 A1  Feb. 7, 2019

Related U.S. Application Data

(60) Provisional application No. 62/539,562, filed on Aug. 1, 2017.

(51) Int. Cl.
*H04W 76/15* (2018.01)
*H04W 76/27* (2018.01)
(Continued)

(52) U.S. Cl.
CPC .......... *H04W 76/15* (2018.02); *H04L 5/0048* (2013.01); *H04W 56/001* (2013.01);
(Continued)

(58) Field of Classification Search
CPC ... H04W 56/001; H04W 76/27; H04W 76/15; H04W 74/0833; H04W 48/10; H04L 5/0048

See application file for complete search history.

(56) References Cited

U.S. PATENT DOCUMENTS

2013/0343345 A1   12/2013  Dinan
2015/0043490 A1*  2/2015  Wu .................. H04W 8/26
                                                    370/329
(Continued)

FOREIGN PATENT DOCUMENTS

CN   104519590 A   4/2015
CN   105580292 A   5/2016
(Continued)

OTHER PUBLICATIONS

3GPP TS 36.423 V14.3.0 (Jun. 2017); 3rd Generation Partnership Project; Technical Specification Group Radio Access Network; Evolved Universal Terrestrial Radio Access Network (E-UTRAN); X2 application protocol (X2AP) (Release 14), pp. 1-242.
(Continued)

*Primary Examiner* — Mandish K Randhawa
(74) *Attorney, Agent, or Firm* — Winston Hsu

(57) ABSTRACT

A first base station (BS) connects to a communication device via a first cell, and transmits a Secondary Node (SN) Addition Request message to a second BS, to configure the second BS as a SN for the communication device in a dual connectivity (DC); the second BS transmits a SN Addition Request Acknowledge message comprising a first radio resource control (RRC) message to the first BS, wherein the first RRC message configures a second cell and comprises a first random access channel (RACH) configuration, the first RACH configuration configures at least one first RACH resource, and the first RRC message configures a first association configuration associating the at least one first RACH resource with a first synchronization signal block or a first channel state information reference signal transmitted via the second cell; the second BS communicating with the communication device via the second cell according to the first RRC message.

13 Claims, 4 Drawing Sheets

(51) Int. Cl.
*H04W 56/00* (2009.01)
*H04L 5/00* (2006.01)
*H04W 74/08* (2009.01)
*H04W 48/10* (2009.01)

(52) U.S. Cl.
CPC ....... *H04W 74/0833* (2013.01); *H04W 76/27* (2018.02); *H04W 48/10* (2013.01)

(56) References Cited

U.S. PATENT DOCUMENTS

| | | |
|---|---|---|
| 2015/0319800 A1 | 11/2015 | Park |
| 2016/0183323 A1 | 6/2016 | Rahman |
| 2016/0219475 A1* | 7/2016 | Kim ..................... H04W 76/15 |
| 2016/0278030 A1 | 9/2016 | Yi |
| 2017/0071023 A1 | 3/2017 | Kunz |
| 2018/0324850 A1* | 11/2018 | Amuru ................. H04L 5/0053 |
| 2019/0037605 A1* | 1/2019 | Agiwal ................ H04L 5/0048 |

FOREIGN PATENT DOCUMENTS

| | | |
|---|---|---|
| CN | 105722213 A | 6/2016 |
| WO | 2015/008956 A1 | 1/2015 |

OTHER PUBLICATIONS

Office action dated Jul. 8, 2019 for the Taiwan application No. 107126513, filing date Jul. 31, 2018, pp. 1-10.
Search Report dated Dec. 11, 2018 for EP application No. 18186421.6, pp. 1-5.
Huawei, HiSilicon, "RACH Procedures and Resource Configuration", 3GPP TSG RAN WG1 Meeting #88, R1-1701724, Feb. 13-17, 2017, Athens, Greece, XP051208890, pp. 1-7.
Guangdong OPPO Mobile Telecom, "NR 4-Step Random Access Procedure", 3GPP TSG RAN WG1 Meeting #89, R1-1707694, May 15-19, 2017, Hangzhou, P.R. China, XP051272900, pp. 1-5.
Office action dated Mar. 5, 2020 for the China application No. 201810866856.5, filing date Aug. 1, 2018, p. 1-12.

* cited by examiner

METHOD OF HANDLING DUAL CONNECTIVITY AND RELATED COMMUNICATION DEVICE

CROSS REFERENCE TO RELATED APPLICATIONS

This application claims the benefit of U.S. Provisional Application No. 62/539,562 filed on Aug. 1, 2017, which is incorporated herein by reference.

BACKGROUND OF THE INVENTION

1. Field of the Invention

The present invention relates to a communication device and a method used in a wireless communication system, and more particularly, to a communication device and a method of handling a dual connectivity.

2. Description of the Prior Art

The third Generation Partnership Project (3GPP) recently starts developing a dual connectivity for a user equipment (UE), a master node and a secondary node. Thus, how to enable the DC is an important issue.

SUMMARY OF THE INVENTION

The present invention therefore provides a method and related communication device for handling a dual connectivity to solve the abovementioned problem.

The method includes: A first BS connecting to a communication device via a first cell belonging to the first BS, and configuring a signaling radio bearer (SRB) to the communication device via the first cell; A first BS transmitting a secondary node (SN) Addition Request message to the second BS, to configure the second BS as a SN for the communication device in the DC; the second BS transmitting a SN Addition Request Acknowledge message comprising a first radio resource control (RRC) message to the first BS in response to the SN Addition Request message, wherein the first RRC message configures a second cell belonging to the second BS and comprises a first random access channel (RACH) configuration for the communication device to perform a random access (RA) to the second cell, the first RACH configuration configures at least one first RACH resource, and the first RRC message configures a first association configuration associating the at least one first RACH resource with a first synchronization signal block (SSB) or a first channel state information reference signal (CSI-RS) transmitted via the second cell; the first BS transmitting a second RRC message comprising the first RRC message to the communication device on the SRB via the first cell; the first BS receiving a RRC response message for responding to the second RRC message from the communication device on the SRB via the first cell or a third cell of the first BS; the second BS receiving a RA preamble from the communication device via the second cell according to the at least one first RACH resource; the second BS transmitting a RA response (RAR) to the communication device in response to the RA preamble, wherein the RAR comprises a preamble identifier associated with the RA preamble; and the second BS communicating with the communication device via the second cell according to the first RRC message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
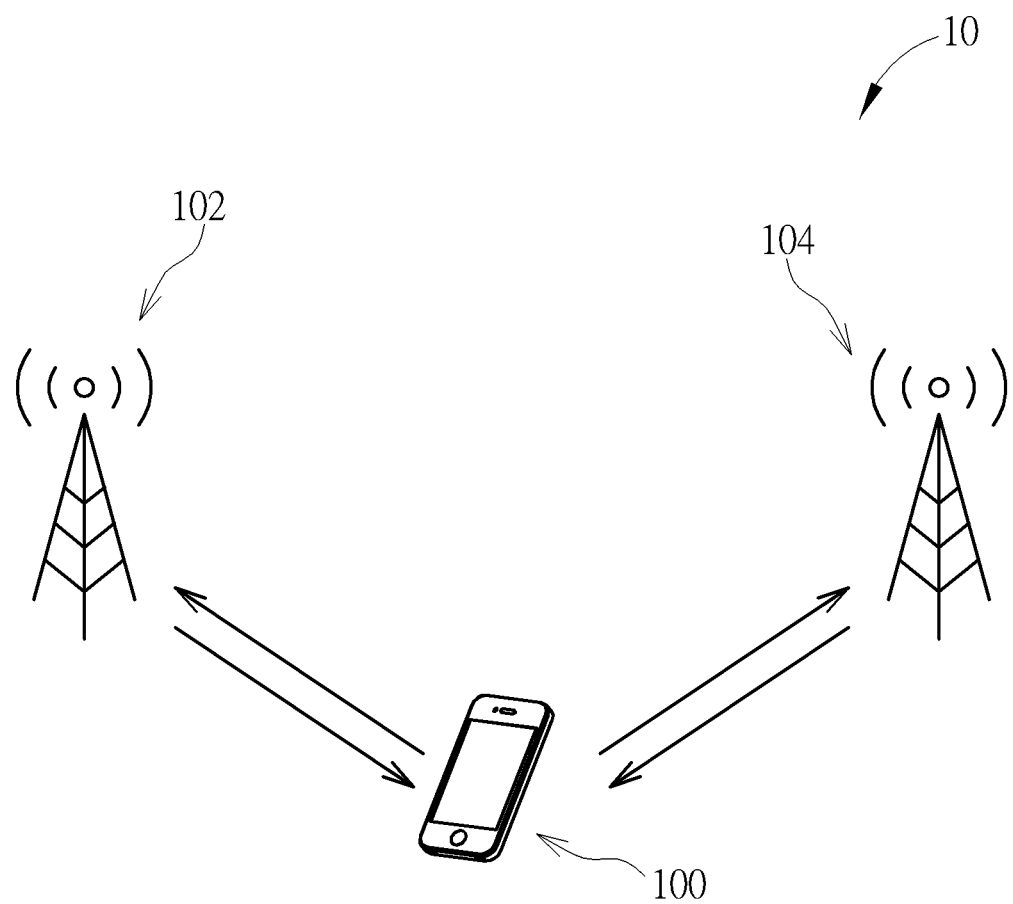
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

As shown in FIG. 1, the communication device 100 may be configured to simultaneously connect to the BSs 102 and 104 (i.e., dual connectivity (DC)). That is, the communication device 100 in the DC may perform a transmission/reception via both the BSs 102 and 104. For example, the communication device 100 may receive packets from the BS 102 at a first carrier frequency and the BS 104 at a second carrier frequency, or the communication device 100 may transmit packets to the BS 102 at a first carrier frequency or the BS 104 at a second carrier frequency. In addition, one of the BSs 102 and 104 may be a master node (MN) and the other BS may be a secondary node (SN).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
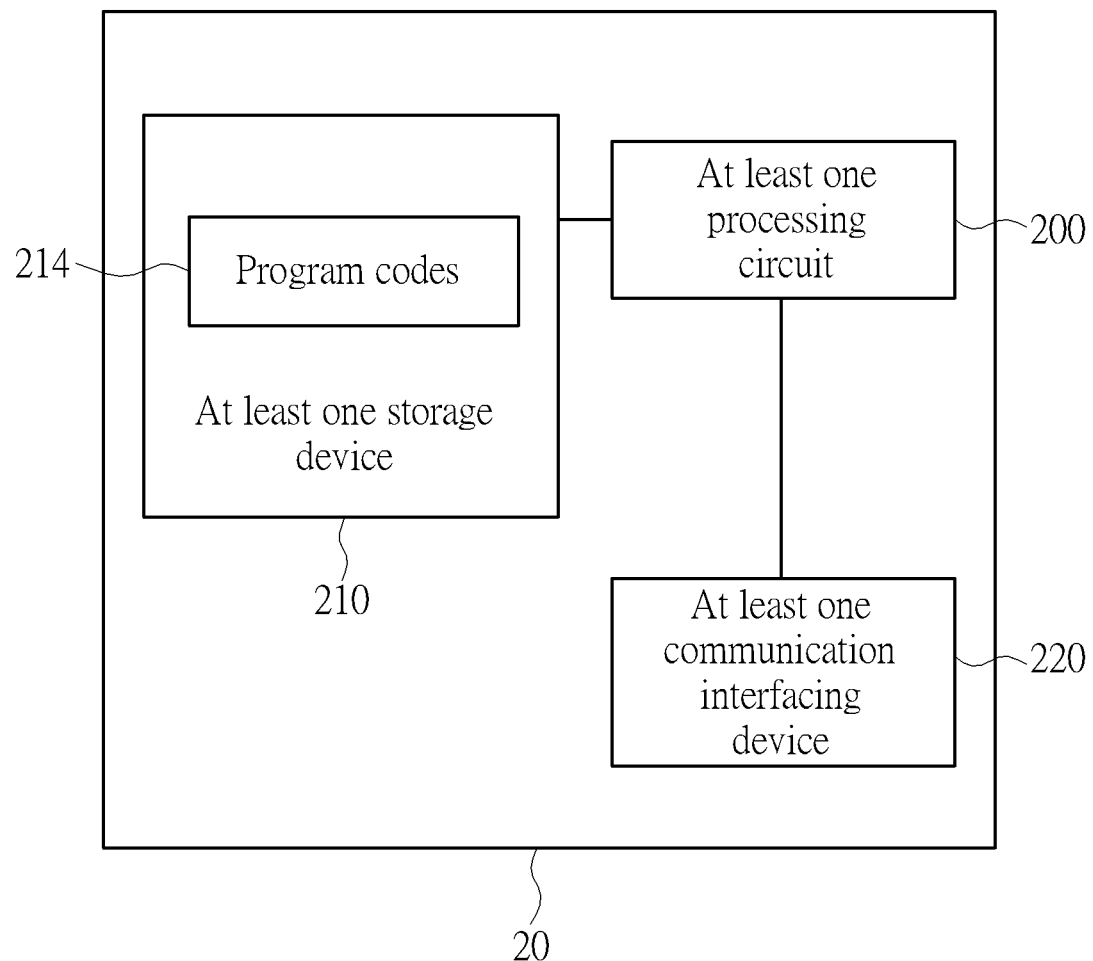
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

Figure 3:
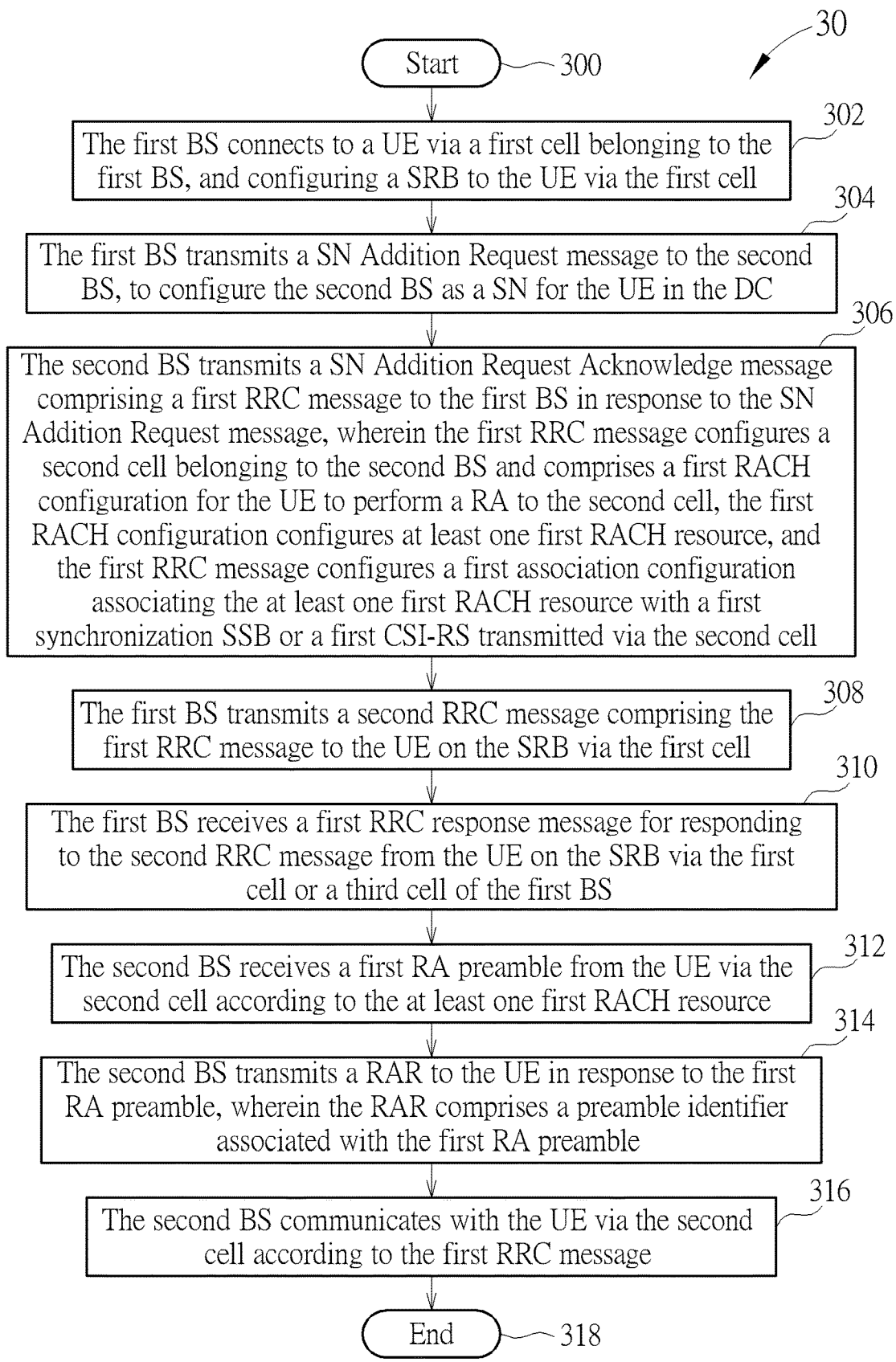
FIG. 3 is a flowchart of a process according to an example of the present invention.

A process 30 in FIG. 3 according to an example of the present invention may be utilized in a first BS (e.g., the BS 102) and a second BS (e.g., the BS 104). The process 30 includes the following steps:

Step 300: Start.

Step 302: The first BS connects to a UE via a first cell belonging to the first BS, and configuring a signaling radio bearer (SRB) to the UE via the first cell.

Step 304: The first BS transmits a SN Addition Request message to the second BS, to configure the second BS as a SN for the UE in the DC.

Step 306: The second BS transmits a SN Addition Request Acknowledge message comprising a first radio resource control (RRC) message to the first BS in response to the SN Addition Request message, wherein the first RRC message configures a second cell belonging to the second BS and comprises a first random access channel (RACH) configuration for the UE to perform a random access (RA) to the second cell, the first RACH configuration configures at least one first RACH resource, and the first RRC message configures a first association configuration associating the at least one first RACH resource with a first synchronization signal block (SSB) or a first channel state information reference signal (CSI-RS) transmitted via the second cell.

Step 308: The first BS transmits a second RRC message comprising the first RRC message to the UE on the SRB via the first cell.

Step 310: The first BS receives a first RRC response message for responding to the second RRC message from the UE on the SRB via the first cell or a third cell of the first BS.

Step 312: The second BS receives a first RA preamble from the UE via the second cell according to the at least one first RACH resource.

Step 314: The second BS transmits a RA response (RAR) to the UE in response to the first RA preamble, wherein the RAR comprises a preamble identifier associated with the first RA preamble.

Step 316: The second BS communicates with the UE via the second cell according to the first RRC message.

Step 318: End.

In one example, the first cell is a primary cell (PCell) or a secondary cell (SCell). The second cell is a primary SCell (PSCell). The third cell is a PCell or a SCell. The first association configuration may be included in the first RACH configuration or in the first RRC message.

In one example, the second BS transmits (or broadcasts) the first SSB or the first CSI-RS to the UE via the second cell. When the first association configuration associates the at least one first RACH resource with the first CSI-RS instead of the first SSB, the second BS may still transmit the first SSB via the second cell.

In one example, the second BS obtains (e.g., determines) the first association configuration according to a first measurement result included in the SN Addition Request message. In one example, the first BS transmits a measurement configuration to the UE on the SRB via the first cell before transmitting the second RRC message to the UE. In one example, the UE transmits the first measurement result to the first BS on the SRB via the first cell according to the measurement configuration.

In response to the first RRC message, the UE transmits the first RA preamble according to the at least one first RACH resource via the second cell, when the UE receives (or detects) the first SSB or the first CSI-RS and connects to the first BS via the first cell. The second BS may receive the first RA preamble from the UE according to (or on) the at least one first RACH resource via the second cell.

In one example, the UE connects to the second BS via the second cell according to the first RRC message, while connecting to the first BS via the first cell.

According to the first RA preamble received by the second BS, the second BS knows that the UE receives the first SSB or the first CSI-RS via the second cell. The second BS may transmit data to the UE on at least one first transmit (Tx) beam via the second cell according to the first RA preamble, wherein (or because) the at least one first Tx beam is associated with the first SSB or the first CSI-RS. That is, in response to the first RA preamble, the second BS may transmit control signals (e.g., physical DL control channel (PDCCH)) and/or the data (e.g., physical DL shared channel (PDSCH)) to the UE on the at least one first Tx beam.

In one example, the second BS transmits the RAR to the UE on a second Tx beam via the second cell, when transmitting the RAR to the UE via the second cell. The second Tx beam may be associated with the first SSB or the first CSI-RS, or may be associated with a receive (Rx) beam for receiving the first RA preamble.

The first BS may perform transmission(s) via the first cell on a third plurality of Tx beams or on a fourth single Tx beam. The second BS may perform transmission(s) via the second cell on a fifth plurality of Tx beams. The third plurality of Tx beams may be the same as or different from the fifth plurality of Tx beams. One or more of the third plurality of Tx beams may be the same as one or more of the fifth plurality of Tx beams.

The at least one first RACH resource may include at least one of time resource (s), frequency resource (s) and the first RA preamble. A time resource may include a time unit (e.g., OFDM symbol(s), mini-slot(s), slot(s) or subframe(s)). A frequency resource may include PRB(s) or subcarrier(s). The first RA preamble may be a dedicated preamble. The first RA preamble may be selected by the UE from a first plurality of RA preambles configured in the first RACH configuration, configured in the first RRC message, predefined in the third Generation Partnership Project (3GPP) specification or configured in a system information block (SIB). The SIB may be included in the first RRC message or may be broadcasted by the second BS via the second cell.

In one example, the first association configuration includes a SSB index of the first SSB or a first CSI-RS index (or identifier/identity) of the first CSI-RS. In one example, the first RRC message or the first association configuration includes a CSI-RS configuration of the first CSI-RS. The CSI-RS configuration may configure at least one of time resources and frequency resources of the first CS-RS. The CSI-RS configuration may include the first CSI-RS index.

In one example, the first RACH configuration includes at least one second RACH resource and a second association configuration associating the at least one second RACH resource with a second SSB or a second CSI-RS transmitted via the second cell. The at least one second RACH resource may include at least one of time resource(s) (e.g., which OFDM symbol(s), slot(s) or subframe(s)), frequency resource(s) (e.g., which PRB(s) or which subcarrier(s)) and a second RA preamble. Then, the UE may determine to use the at least one first RACH resource instead of the at least one second RACH resource, when a signal strength of the first SSB (or the first CSI-RS) measured/received by the UE is better (e.g., greater) than a signal strength of the second SSB (or the second CSI-RS) measured/received by the UE. In one example, the first RRC message includes a second RACH configuration including the at least one second RACH resource and the second association configuration. The second BS may determine the second association configuration according to a second measurement result included in the SN Addition Request message.

In the above examples, the UE may determine to use the at least one second RACH resource instead of the at least one first RACH resource, when a signal strength of the second SSB (or the second CSI-RS) measured/received by the UE is better (e.g., greater) than a signal strength of the first SSB (or the first CSI-RS) measured/received by the UE. In response to the determination, the UE may transmit the first RA preamble or the second RA preamble according to the at least one second RACH resource. In one example, the second RA preamble is configured in the second RACH configuration and is associated with the at least one second RACH resource and/or the second SSB (or the second CSI-RS). In one example, the second RA preamble is selected from a second plurality of RA preambles or the first plurality of RA preambles. The second plurality of RA preambles may be configured in the second RACH configuration, configured in the first RRC message, predefined in the 3GPP specification or configured in a SIB. The SIB may be included in the first RRC message or may be broadcasted by the first BS via the second cell.

The at least one second RACH resource may include at least one of time resource(s) (e.g., which OFDM symbol(s), slot(s) or subframe(s)) and frequency resource(s) (e.g., which PRB(s) or which subcarrier(s)) for the UE to perform a RA to the second cell. In one example, the second association configuration configures (or includes) a SSB index of the second SSB or a second CSI-RS index of the second CSI-RS. In one example, the second association configuration includes a CSI-RS configuration of the second CSI-RS. The CSI-RS configuration may configure at least one of time resources and frequency resources of the second CSI-RS. The CSI-RS configuration may include the second CSI-RSI index.

In one example, the first BS is a MN of the UE. In one example, the first RRC message does not configure a handover. That is, the first RRC message is only for adding the second BS as the SN to the UE.

In one example, the second RRC message does not configure a handover. The second RRC message may or may not change (e.g., update) a configuration of the first BS which has been transmitted by the first BS to the UE before. The second RRC message may or may not include a new configuration which has not been transmitted to the UE before.

In one example, the second RRC message configures a handover. The second RRC message may include a third RACH configuration for the UE to perform the handover. The third RACH configuration may configure at least one third RACH resource for the UE to perform a RA in the handover. The UE may perform the RA by transmitting a third RA preamble according to the third RACH configuration. In one example, the second RRC message configures the at least one third RACH resource associated with neither a SSB nor a CSI-RS.

In one example, the second RRC message configures the at least one third RACH resource associated with a third SSB or a third CSI-RS. In response to the second RRC message, the UE may transmit the third RA preamble according to the at least one third RACH resource via a fourth cell of the first BS (e.g., intra-BS handover) or a third BS (e.g., inter-BS handover), when the UE receives (or detects) the third SSB or the third CSI-RS via the fourth cell. The first BS may receive the third RA preamble according to the at least one third RACH resource for the intra-BS handover. The third BS may receive the third RA preamble according to the at least one third RACH resource for the inter-BS handover.

In one example, the first BS is a MN (e.g., master eNB) and the second BS is a SN (e.g., secondary gNB). The first RRC message may be a NR RRC message (e.g., NR RRC Reconfiguration message). In one example, the first RRC response message may or may not include a second RRC response message. If the second RRC response message is included in the first RRC response message, the second RRC response message may be a NR RRC response message (e.g., NR RRC Connection Reconfiguration Complete message). The first RRC message may be an E-UTRA RRC message (e.g., E-UTRA RRC Connection Reconfiguration message).

In one example, the UE connects to the first BS (or the first BS may connect to the UE) by performing a RRC connection establishment procedure. In the RRC connection establishment procedure, the UE transmits a RRC Connection Request message to the first BS, and receives a RRC Connection Setup message from the first BS. When the UE receives the RRC Connection Setup message, the UE connects to the first BS. When the first BS transmits the RRC Connection Setup message, receives an acknowledgement message acknowledging the RRC connection Setup message, or receives a RRC Connection Complete message for responding to the RRC Connection Setup message from the UE, the first BS connects to the UE.

In one example, the UE connects to the first BS (or the first BS may connect to the UE) by performing a handover procedure initiated by a fourth BS. The fourth BS may transmit a handover command to the UE to initiate the handover procedure.

The RACH configuration(s) mentioned above may include at least one information element (IE).

The time resource (s) mentioned above may be formed by one or more OFDM symbols, slot (s), mini-slot (s) or subframe (s). The PRB may include a plurality of subcarriers (e.g., 12 or 24 subcarriers). The at least one first, second and third RACH resources may be the same or (completely or partly) different. The first, second and third SSBs may be different. The first, second and third CSI-RSs may be (completely or partly) different.

In one example, the SN Addition Request message includes a first UE capability of the UE. The first UE capability may be related to a beamforming capability (e.g., a beam correspondence is supported or not) or a RA capability. The second BS may determine the RACH resource (s) mentioned above (e.g., a content of the RACH resource (s) mentioned above) according to the first UE capability. In one example, the SN Addition Request message includes a second UE capability of the UE. The second UE capability may be related to a CSI-RS receiving capability (e.g., a CSI-RS is supported or not). The second BS may determine that the RACH resource(s) mentioned above is associated with the CSI-RS, when the second UE capability indicates that the CSI-RS is supported. The second BS may determine that the RACH resource(s) mentioned above is associated with the SSB, when the second UE capability indicates that the CSI-RS is not supported.

Descriptions/examples for the UE in the process 30 may be concluded to a process 40.

Figure 4:
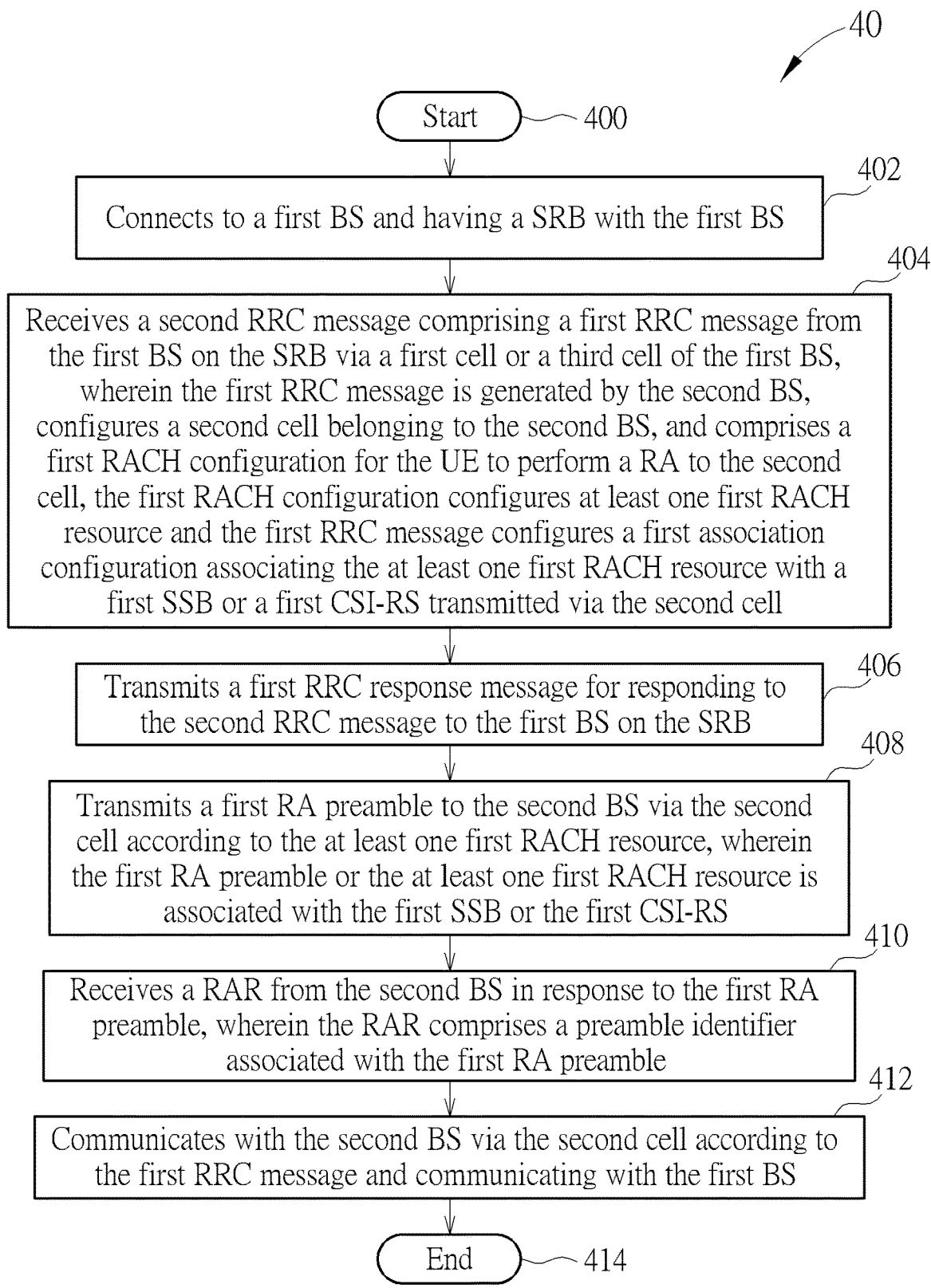
FIG. 4 is a flowchart of a process according to an example of the present invention.

The process 40 in FIG. 4 according to an example of the present invention may be utilized in a UE. The process 40 includes the following steps:

Step 400: Start.

Step 402: Connects to a first BS and having a SRB with the first BS.

Step 404: Receives a second RRC message comprising a first RRC message from the first BS on the SRB via a first cell or a third cell of the first BS, wherein the first RRC message is generated by the second BS, configures a second cell belonging to the second BS, and comprises a first RACH configuration for the UE to perform a RA to the second cell, the first RACH configuration configures at least one first RACH resource and the first RRC message configures a first association configuration associating the at least one first RACH resource with a first SSB or a first CSI-RS transmitted via the second cell.

Step 406: Transmits a first RRC response message for responding to the second RRC message to the first BS on the SRB.

Step 408: Transmits a first RA preamble to the second BS via the second cell according to the at least one first RACH resource, wherein the first RA preamble or the at least one first RACH resource is associated with the first SSB or the first CSI-RS.

Step 410: Receives a RAR from the second BS in response to the first RA preamble, wherein the RAR comprises a preamble identifier associated with the first RA preamble.

Step 412: Communicates with the second BS via the second cell according to the first RRC message and communicating with the first BS.

Step 414: End.

The following example is concluded according to the above processes, and may be applied to the above processes. A master eNB (MeNB) transmits a SgNB Addition Request to a secondary gNB (SgNB), to configure the SgNB as a SN for the UE in the DC. The MeNB may provide at least one latest measurement result received from the UE to the SgNB, for the SgNB to determine at least one secondary cell group (SCG) cell of the SgNB and to configure the at least one SCG cell of the SgNB to the UE. The SgNB determines a PScell of the SgNB and other SCG Scells of the SgNB, and provides a (e.g., new) SCG radio resource configuration to the MeNB in a SgNB Addition Request Acknowledge message including a NR RRC message. The NR RRC message includes a RACH configuration for the UE to perform a RA via the PSCell, and the RACH configuration configures at least one RACH resource. The NR RRC message configures an association configuration associating the at least one RACH resource with a SSB or a CSI-RS transmitted by the SgNB via the PSCell.

The MeNB initiates a RRC Connection Reconfiguration procedure with the UE. The MeNB transmits a RRC Connection Reconfiguration message including the NR RRC message to the UE. The UE applies the association configuration and transmits a RRC Connection Reconfiguration Complete message including a NR RRC response message, in response to the RRC Connection Reconfiguration message. The MeNB transmits a SgNB Reconfiguration Complete message including the NR RRC response message to the SgNB, to inform the SgNB that the UE has completed the RRC Connection Reconfiguration procedure successfully. The UE performs the RA to the PSCell of the SgNB by transmitting a RA preamble on the at least one RACH resource associated to the SSB or the CSI-RS. The order that the UE transmits the RRC Connection Reconfiguration Complete message and the UE performs the RA is not limited. A successful RA is not required for a completion of the RRC Connection Reconfiguration procedure.

Descriptions/examples for the process 30 may be applied to the process 40, and are not repeated herein. The following may be applied to the processes above.

The "determine" described above may be replaced by "select", "compute", "calculate" or "obtain". The "according to" described above may be replaced by "in" or "on". The "associated with" described above may be replaced by "of" or "corresponding to". The "via" described above may be replaced by "on".

The at least one RACH resource may include a RACH resource or a plurality of RACH resources.

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process(es) involving the first BS and second BS, the steps performed by the first BS may be compiled into the program codes 214 of the first BS and the steps performed by the second BS may be compiled into the program codes 214 of the second BS.

To sum up, the present invention provides a method and a communication device for handing a DC. A SN may transmit an association configuration associating at least one RACH resource with a SSB or a CSI-RS to a UE via a MN. The UE and the SN may communicate with each other according to the association configuration. Thus, the problem of enabling the DC is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) and a second BS for handling a dual connectivity (DC), comprising:

at least one storage device; and at least one processing circuit, coupled to the at least one storage device, wherein the at least one storage device stores, and the at least one processing circuit is configured to execute instructions of:

the first BS connecting to a communication device via a first cell belonging to the first BS, and configuring a signaling radio bearer (SRB) to the communication device via the first cell;

the first BS transmitting a Secondary Node (SN) Addition Request message to the second BS, to configure the second BS as a SN for the communication device in the DC;

the second BS transmitting a SN Addition Request Acknowledge message comprising a first radio resource control (RRC) message to the first BS in response to the SN Addition Request message, wherein the first RRC message comprises a configuration for a second cell belonging to the second BS and comprises a first random access channel (RACH) configuration for the communication device to perform a random access (RA) to the second cell, the first RACH configuration configures at least one first RACH resource, and the first RRC message configures a first association configuration associating the at least one first RACH resource with a first synchronization signal block (SSB) or a first channel state information reference signal (CSI-RS) transmitted via the second cell;

the first BS transmitting a second RRC message comprising the first RRC message to the communication device on the SRB via the first cell;

the first BS receiving a RRC response message for responding to the second RRC message from the communication device on the SRB via the first cell or a third cell of the first BS;

the second BS receiving a RA preamble from the communication device via the second cell according to the at least one first RACH resource;

the second BS transmitting a RA response (RAR) on a first transmit (Tx) beam to the communication device in response to the RA preamble, wherein the RAR comprises a preamble identifier associated with the RA preamble, wherein the first Tx beam is associated with the first SSB or the first CSI-RS, or is associated with a receive (Rx) beam for receiving the first RA preamble;

the second BS communicating with the communication device via the second cell according to the first RRC message; and the second BS transmitting or broadcasting the first SSB or the first CSI-RS to the communication device via the second cell.

2. The network of claim 1, wherein the instructions further comprise:

the second BS obtaining the first association configuration according to a first measurement result comprised in the SN Addition Request message.

3. The network of claim 1, wherein the instructions further comprise:

the second BS receiving the RA preamble from the communication device according to the at least one first RACH resource via the second cell.

4. The network of claim 1, wherein the instructions further comprise:

the second BS transmitting data to the communication device on at least one second Tx beam via the second cell according to the RA preamble, wherein the at least one second Tx beam is associated with the first SSB or the first CSI-RS.

5. The network of claim 1, wherein the first RACH configuration comprises at least one second RACH resource and a second association configuration associating the at least one second RACH resource with a second SSB or a second CSI-RS transmitted via the second cell.

6. A communication device for handling a dual connectivity (DC), comprising:

at least one storage device; and at least one processing circuit, coupled to the at least one storage device, wherein the at least one storage device stores, and the at least one processing circuit is configured to execute instructions of:

connecting to a first base station (BS) and having a signaling radio bearer (SRB) with the first BS;

receiving a second radio resource control (RRC) message comprising a first RRC message from the first BS on the SRB via a first cell or a third cell of the first BS, wherein the first RRC message is generated by a second BS, comprises a configuration for a second cell belonging to the second BS, and comprises a first random access channel (RACH) configuration for the communication device to perform a random access (RA) to the second cell, the first RACH configuration configures at least one first RACH resource and the first RRC message configures a first association configuration associating the at least one first RACH resource with a first synchronization signal block (SSB) or a first channel state information reference signal (CSI-RS) transmitted via the second cell;

transmitting a RRC response message for responding to the second RRC message to the first BS on the SRB;

receiving the first SSB or the first CSI-RS via the second cell from the second BS;

transmitting a first RA preamble to the second BS via the second cell according to the at least one first RACH resource, wherein the first RA preamble or the at least one first RACH resource is associated with the first SSB or the first CSI-RS;

receiving a RA response (RAR) from a transmit (Tx) beam of the second BS in response to the first RA preamble, wherein the RAR comprises a preamble identifier associated with the first RA preamble, and the Tx beam is associated with the first SSB or the first CSI-RS or is associated with a receive (Rx) beam for receiving the first RA preamble; and communicating with the second BS via the second cell according to the first RRC message and communicating with the first BS.

7. The communication device of claim 6, wherein the instructions further comprise:

transmitting the first RA preamble to the second BS via the second cell according to the at least one first RACH resource when receiving the first SSB or the first CSI-RS and connects to the first BS via the first cell, in response to the first RRC message.

8. The communication device of claim 6, wherein the first RACH configuration comprises at least one second RACH resource and a second association configuration associating the at least one second RACH resource with a second SSB or a second CSI-RS transmitted via the second cell.

9. The communication device of claim 8, wherein the instructions further comprise:

determining to use the at least one second RACH resource instead of the at least one first RACH resource when a second signal strength of the second SSB received by the communication device is better than a first signal strength of the first SSB received by the communication device; and transmitting the first RA preamble or a second RA preamble on the at least one second RACH resource.

10. A method for handling a dual connectivity (DC) by a communication device, comprising:

connecting to a first base station (BS) and having a signaling radio bearer (SRB) with the first BS;

receiving a second radio resource control (RRC) message comprising a first RRC message from the first BS on the SRB via a first cell or a third cell of the first BS, wherein the first RRC message is generated by a second BS, comprises a configuration for a second cell belonging to the second BS, and comprises a first random access channel (RACH) configuration for the communication device to perform a random access (RA) to the second cell, the first RACH configuration configures at least one first RACH resource and the first RRC message configures a first association configuration associating the at least one first RACH resource with a first synchronization signal block (SSB) or a first channel state information reference signal (CSI-RS) transmitted via the second cell;

transmitting a RRC response message for responding to the second RRC message to the first BS on the SRB;

receiving the first SSB or the first CSI-RS via the second cell from the second BS;

transmitting a first RA preamble to the second BS via the second cell according to the at least one first RACH resource, wherein the first RA preamble or the at least one first RACH resource is associated with the first SSB or the first CSI-RS;

receiving a RA response (RAR) from a transmit (Tx) beam of the second BS in response to the first RA preamble, wherein the RAR comprises a preamble identifier associated with the first RA preamble, and the Tx beam is associated with the first SSB or the first CSI-RS or is associated with a receive (Rx) beam for receiving the first RA preamble; and communicating with the second BS via the second cell according to the first RRC message and communicating with the first BS.

11. The method of claim 10, further comprising:
transmitting the first RA preamble to the second BS via the second cell according to the at least one first RACH resource when receiving the first SSB or the first CSI-RS and connects to the first BS via the first cell, in response to the first RRC message.

12. The method of claim 10, wherein the first RACH configuration comprises at least one second RACH resource and a second association configuration associating the at least one second RACH resource with a second SSB or a second CSI-RS transmitted via the second cell.

13. The method of claim 12, further comprising:
determining to use the at least one second RACH resource instead of the at least one first RACH resource when a second signal strength of the second SSB received by the communication device is better than a first signal strength of the first SSB received by the communication device; and transmitting the first RA preamble or a second RA preamble on the at least one second RACH resource.

* * * * *